(12) United States Patent
Mueller et al.

(10) Patent No.: US 8,061,386 B2
(45) Date of Patent: Nov. 22, 2011

(54) SWIVEL JOINT FOR FAUCET

(75) Inventors: Jeffrey L. Mueller, Plymouth, WI (US); Mario E. Semchuck, Scottsdale, AZ (US)

(73) Assignee: Kohler Co., Kohler, WI (US)

( * ) Notice: Subject to any disclaimer, the term of this patent is extended or adjusted under 35 U.S.C. 154(b) by 738 days.

(21) Appl. No.: 12/099,493

(22) Filed: Apr. 8, 2008

(65) Prior Publication Data
US 2008/0277927 A1    Nov. 13, 2008

Related U.S. Application Data

(60) Provisional application No. 60/916,505, filed on May 7, 2007.

(51) Int. Cl.
*E03C 1/00* (2006.01)

(52) U.S. Cl. ................. 137/801; 285/281

(58) Field of Classification Search ........... 137/801; 4/675–678; 285/275, 276, 280, 281, 321
See application file for complete search history.

(56) References Cited

U.S. PATENT DOCUMENTS

| | | |
|---|---|---|
| 381,008 A | 4/1888 | Gould |
| 2,427,124 A | 7/1944 | Dawson |
| 2,818,878 A | 1/1958 | Russell |
| D326,505 S | 5/1992 | Kohler, Jr. et al. |
| D326,506 S | 5/1992 | Kohler, Jr. |
| 5,833,849 A | 11/1998 | Primdahl |
| 6,425,149 B1 | 7/2002 | Wang |
| D464,711 S | 10/2002 | Warshawsky |
| D465,270 S | 11/2002 | Gottwald |
| D492,393 S | 6/2004 | Herring et al. |
| 7,415,991 B2 * | 8/2008 | Meehan et al. .......... 137/801 |
| 2006/0180222 A1 | 8/2006 | Kang |
| 2006/0237072 A1 * | 10/2006 | Lee ....................... 137/801 |

FOREIGN PATENT DOCUMENTS

| | | |
|---|---|---|
| AT | 309346 AT | 8/1973 |
| DE | 202004013395 | 11/2004 |

OTHER PUBLICATIONS 3 pages of an EP communication dated Apr. 27, 2010 in the corresponding EP 08743376.9 application.
Kohler Co. "HiRise deck-mount kitchen pot filler". Model No. K-7323-4. Kohler Co. online catalog. Copyright 2007 Kohler Co.
Notification of Transmittal of the International Search Report and the Written Opinion of the International Searching Authority, or the Declaration for PCT Application No. PCT/US2008/005470, filed Apr. 29, 2008.
Written Opinion of the International Searching Authority for PCT/US2008/005470, filed Apr. 29, 2008.

* cited by examiner

*Primary Examiner* — Craig Schneider
(74) *Attorney, Agent, or Firm* — Foley & Lardner LLP

(57) ABSTRACT

A faucet having a swivel joint for adjusting the position of an outlet of the faucet. A flow coupler is fixed to a first faucet tube and a sleeve is removably and pivotally linked to the flow coupler by a fastener. A second faucet tube is then removably linked to the sleeve allowing the second faucet tube and sleeve to pivot about the flow coupler to adjust the outlet of the faucet.

17 Claims, 5 Drawing Sheets

SWIVEL JOINT FOR FAUCET

CROSS-REFERENCE TO RELATED APPLICATIONS

This application claims priority from U.S. provisional application No. 60/916,505, filed May 7, 2007, which is hereby incorporated by reference as if fully set forth herein.

STATEMENT OF FEDERALLY SPONSORED RESEARCH OR DEVELOPMENT

Not applicable.

BACKGROUND OF THE INVENTION

The present invention relates to a joint for use in a plumbing fitting. More particularly, it relates to a swivel joint for adjusting the position of an outlet of a faucet.

Many faucets include the ability to swivel, rotate or pivot. For example, the spout of a kitchen faucet is generally designed to rotate about the mounting base to provide greater access to the sink. More elaborate faucets include multiple joints providing multiple pivot axes. Pot filler faucets typically incorporate a plurality of joints allowing the outlet of the faucet to reach a substantial distance to fill a pot placed on a nearby stove or range.

Typical swivel joint construction attempts to maintain joint serviceability, while simultaneously minimizing flow intrusion and the overall structure. Convenient serviceability, however, often results in bulky joints having restricted flow paths. For example, U.S. Pat. No. 6,425,149 illustrates a joint having reasonable serviceability. However, the joint structure is significantly larger than the structure of the adjacent tubes and creates a relatively narrow passageway from one tube to the next.

Alternatively, reducing the joint structure and attempting to maximize the flow passageway often leads to joints having limited serviceability. As an example, U.S. Pat. No. 381,008 provides a joint having a relatively consistent outer appearance. However, the telescoping joint is incapable of being serviced without significant deconstruction of the overall joint assembly.

Thus, a need continues to exist for a faucet having a swivel joint providing convenient joint serviceability, limited flow restriction, and efficient joint construction.

SUMMARY OF THE INVENTION

The present invention provides an improved swivel joint for removably and pivotally linking faucet tubes to provide adjustment of an outlet of a faucet. A flow coupler is fixed to a first faucet tube and a sleeve is removably and pivotally linked to the flow coupler by a fastener. A second faucet tube is then removably linked to the sleeve allowing the second faucet tube and sleeve to pivot about the flow coupler to adjust the outlet of the faucet.

In one aspect, the present invention provides a faucet having a swivel joint for adjusting the position of an outlet of the faucet, comprising first and second faucet tubes defining flow passages in fluid communication with the outlet, a flow coupler having a flow passageway extending from a first end fixed relative to the first faucet tube to a second end so as to communicate with the flow passages of the first and second faucet tubes, a sleeve removably linked to the second faucet tube, and a fastener linking the sleeve to the flow coupler so as to removably and pivotally link the first and second faucet tubes together.

The resulting swivel joint is easily serviceable, provides a significantly unobstructed flow passage between the first faucet tube and the second faucet tube, and creates a uniform joint between the faucet tubes. Moreover, the swivel joint can be implemented without significantly altering the external appearance of the faucet, and can be contained almost entirely within the diameter of the faucet tubes or alternatively so as not to extend beyond the outer diameter of the faucet tubes.

These and other advantages of the invention will be apparent from the detailed description and drawings. What follows are one or more example embodiments of the present invention. To assess the full scope of the invention the claims should be looked to, as the example embodiments are not intended as the only embodiments within the scope of the invention.

DETAILED DESCRIPTION OF THE EXAMPLE EMBODIMENTS

The example embodiments describe the invention in relation to deck mount and wall mount pot filler faucets. However, the invention is equally applicable to other types and styles of plumbing fixtures in which pivotal motion may be incorporated. For example, the swivel joint may be incorporated into the shower head arm used in a shower stall to adjust the position of the outlet of the shower head.

Figure 1:
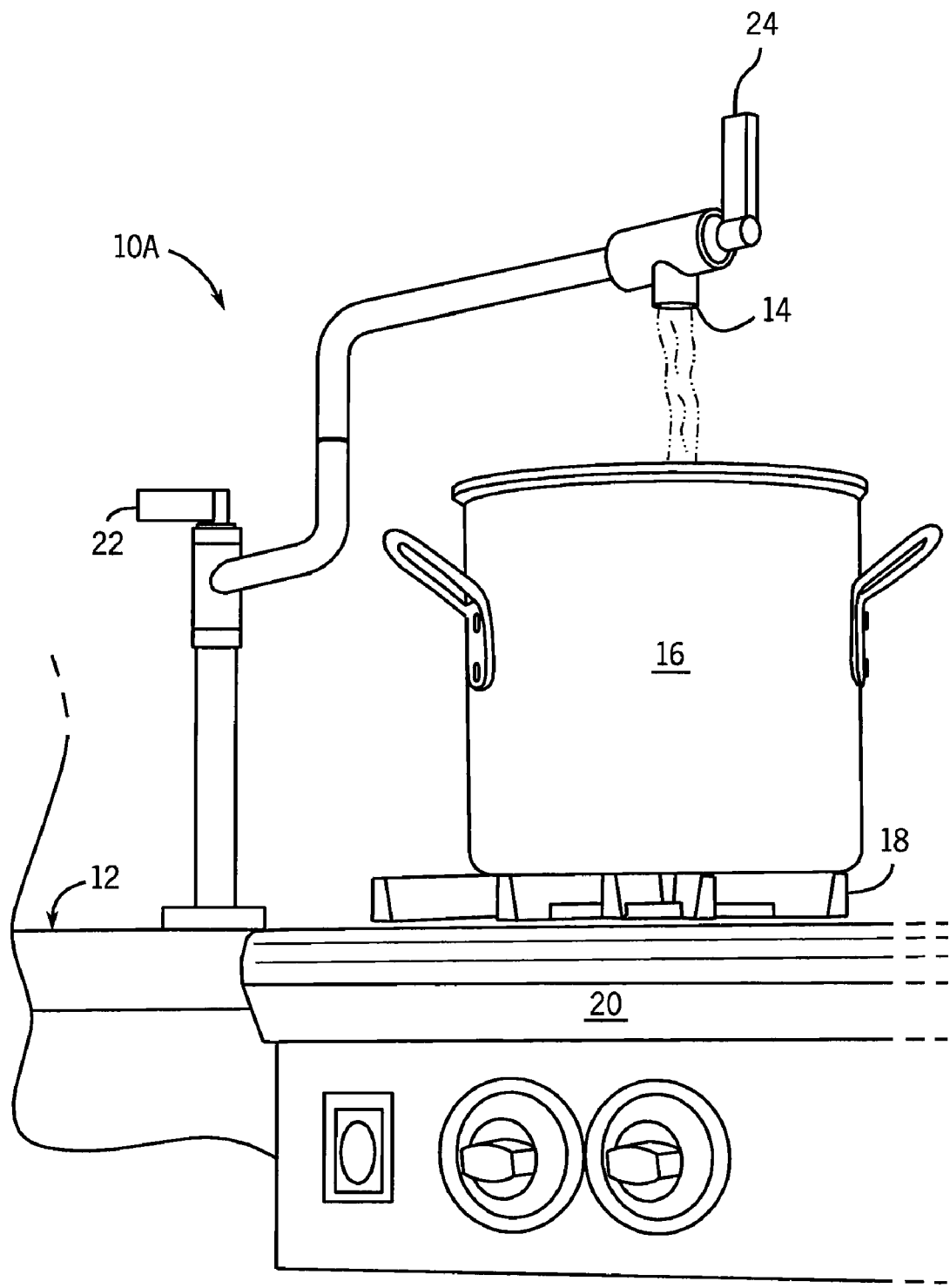
FIG. 1 is a perspective view of an example embodiment of the invention in connection with a deck mounted pot filler faucet.

With reference to FIG. 1, a deck mounted pot filler faucet 10A is shown mounted to a counter 12. The outlet 14 is shown rotated over an adjacent pot 16 placed atop a burner 18 of a stove 20. A base handle 22 and an outlet handle 24 are shown for controlling the flow of water through the faucet 10A. In one example configuration, the base handle 22 may operate a mixing valve for adjusting the temperature of the water at the outlet 14, and the outlet handle 24 may operate a control valve capable of turning the flow of water on and off. This allows a user to adjust the temperature of the water prior to filling the pot 16 and for the faucet 10A to be used as a traditional faucet. Alternatively, both the base handle 22 and the outlet handle 24 may be configured to control the flow of water, not the temperature of the water. The outlet handle 24 allows the user to control the flow while near the pot 16 and at a distance from the base handle 22.

Figure 2:
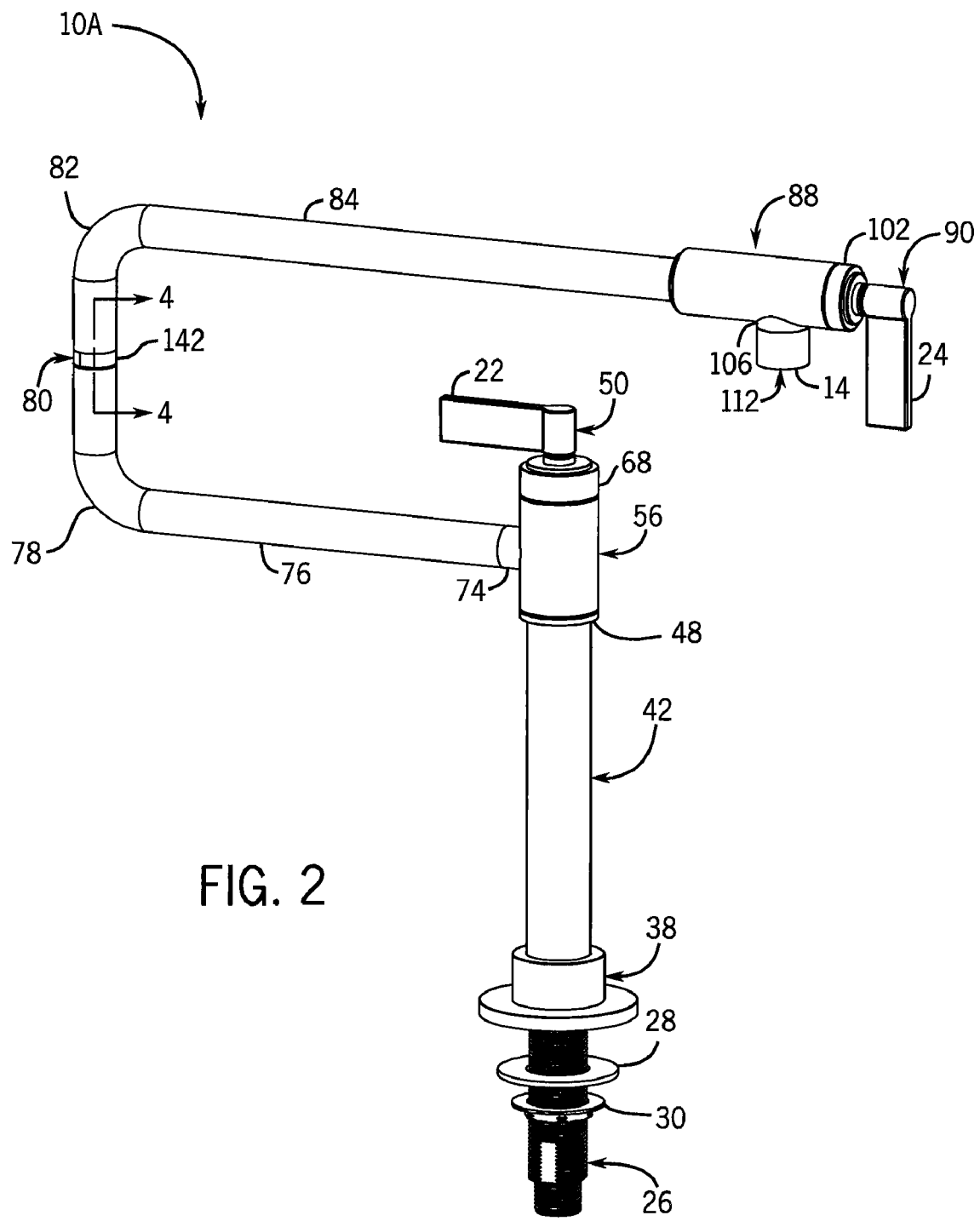
FIG. 2 is a perspective view of the faucet of FIG. 1.
Figure 3:
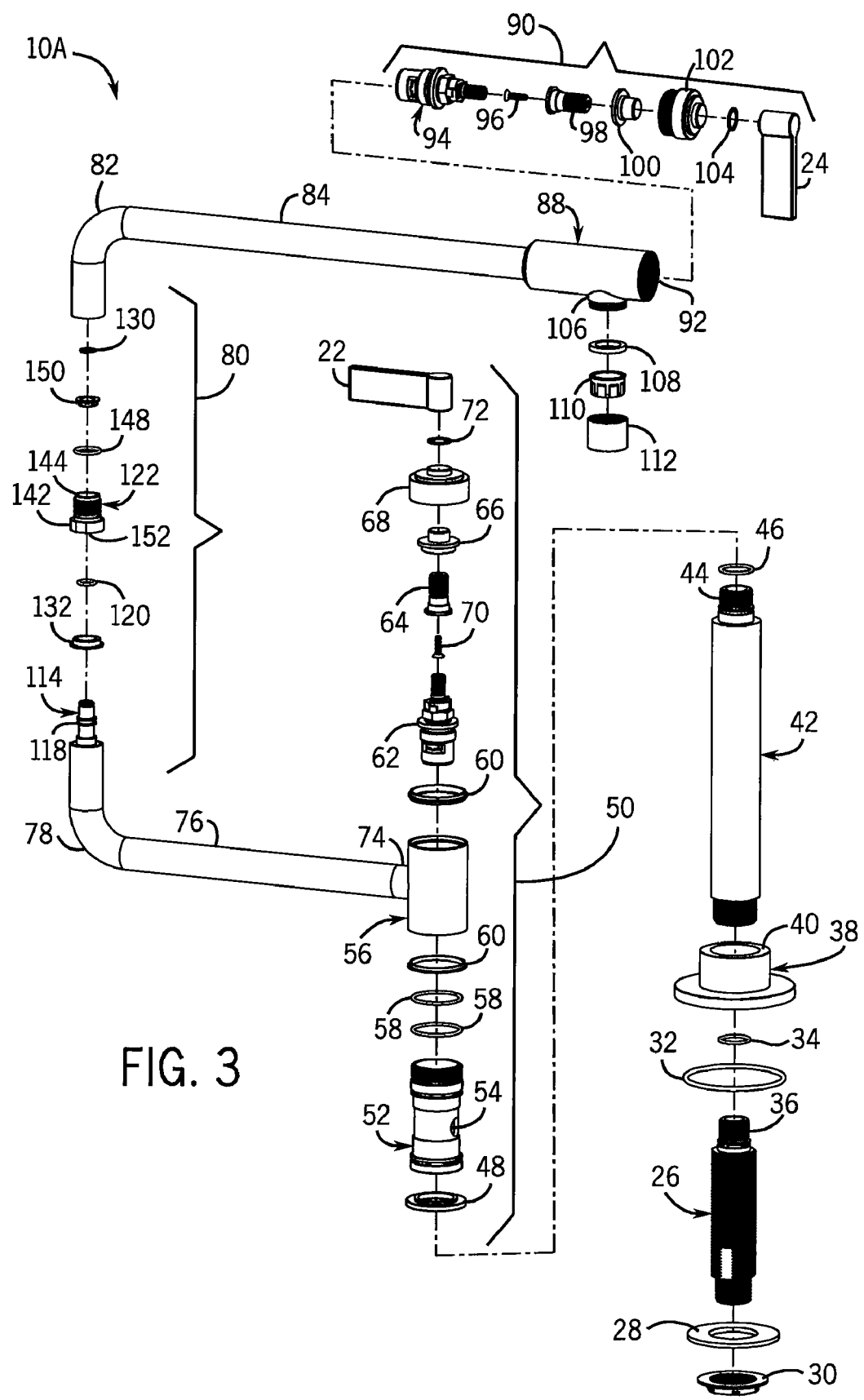
FIG. 3 is an exploded view of the faucet of FIG. 2.

Looking to FIGS. 2 and 3, the deck mounted faucet 10A is shown separate from the counter 12. A threaded, cylindrical deck shank 26 is partially inserted into an opening (not shown) formed in the counter 12. A flat washer 28 and nut 30 are slid over the bottom side and the nut 30 is partially threaded up the deck shank 26. An o-ring 32 is placed atop the counter 12 and a smaller o-ring 34 is seated between a pair of annular ribs 36 extending radially from the upper portion of the deck shank 26. A deck flange 38 having an internally threaded bore 40 is threaded onto the upper portion of the deck shank 26 such that the deck flange 38 rests against the top side of the counter 12. The nut 30 is then tightened against the bottom side of the counter 12, sandwiching the counter 12 between the deck flange 38 and nut 30.

A riser tube 42 having threaded ends is then engaged with the bore 40 of the deck flange 38. The remaining upper end of the riser tube 42 further includes a pair of annular ribs 44 into which an o-ring 46 is seated. Next a disk-shaped riser trim 48 is placed over the upper end of the riser tube 42 forming a platform for the adjacent base valve assembly 50.

A valve body 52 includes a port 54 for communicating fluid from the supply (not shown) to the remainder of the faucet 10A. The valve body 52 is seated in a housing 56 and is flanked at top and bottom by a pair of O-rings 58 and a pair of wear washers 60. The O-rings 58 seal the valve body 52 within the housing 56 and the wear washers 60 provide a bearing surface allowing the housing 56 to rotate about its central vertical axis. A valve cartridge 62 is threaded into mating threads formed in the top of the valve body 52. A stem adapter 64 and handle support 66 are secured to the base handle 22 through a bonnet 68 with the aid of a screw 70. A plastic spacer 72 is seated between the base handle 22 and bonnet 68 to reduce wear between the base handle 22 and the bonnet 68.

The housing 56 includes an exit 74 leading to a first faucet tube 76. An elbow 78 angles the first faucet tube 76 vertically leading to the swivel joint 80. The swivel joint 80 leads to an elbow 82 of a second faucet tube 84. The first and second faucet tubes 76, 84 define a flow passage 86. Continuing along the second faucet tube 84, a valve body 88 is disposed at the end of the second faucet tube 84 for housing an outlet valve assembly 90.

The valve body 88 has a threaded bore 92 along the axis of the second faucet tube 84 into which similar components as the base valve assembly 50 are housed. Specifically, a valve cartridge 94 is threaded into the bore 92 and a screw 96 secures a stem adapter 98 and handle support 100 to the outlet handle 24. A bonnet 102 is then threaded into the bore 92 of the valve body 88. A plastic spacer 104 is again seated between the bonnet 102 and outlet handle 24 to reduce wear between the rotating outlet handle 24 and stationary bonnet 102.

The valve body 88 includes an outlet port 106 having external threads. A washer 108 creates a seal between the outlet port 106 and an aerator 110. An aerator housing 112 threadably engages the exterior threads of the outlet port 106 to restrain the aerator 110.

In operation, fluid flows from an inlet line (not shown), through the deck shank 26 and riser tube 42 until it reaches the base valve assembly 50. When the base valve assembly 50 is opened, fluid flows through the flow passage 86 defined by the first faucet tube 76, through the swivel joint 80, and into the flow passage 86 defined by the second faucet tube 84 where it is regulated by the outlet valve assembly 90. When the outlet valve assembly 90 is opened, fluid flows out of the outlet 14. With the general structure and fluid flow of the faucet 10A described, we turn our attention to the swivel joint 80.

Figure 4:
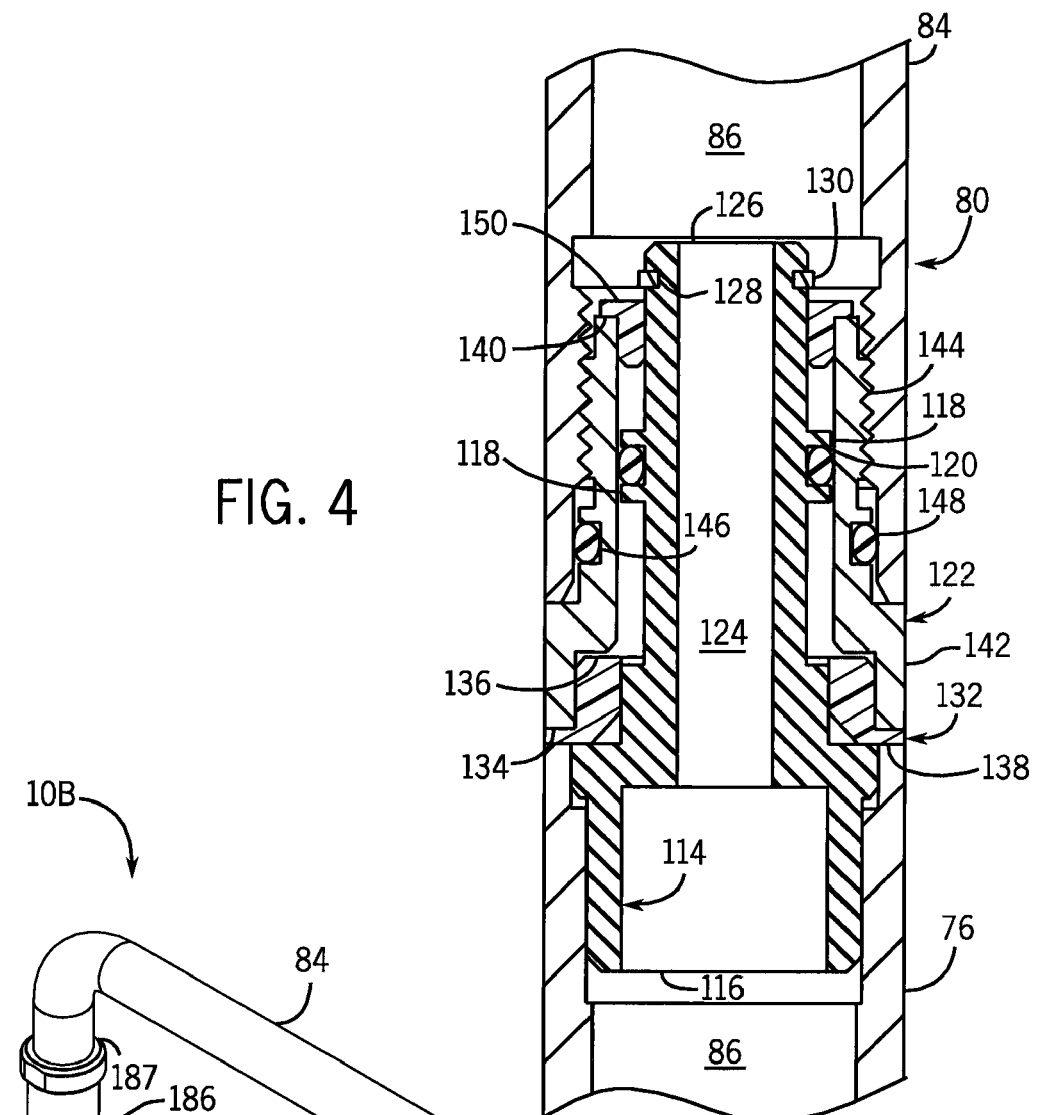
FIG. 4 is a partial section view taken along line 4-4 of FIG. 2.

With specific reference to FIGS. 3 and 4, the swivel joint 80 allows the second faucet tube 84 to pivot with respect to the first faucet tube 76. A flow coupler 114 extends from the first faucet tube 76 and defines a flow passageway 124 extending from a first end 116 to a second end 126. The flow coupler 114 is preferably concentrically aligned with the first faucet tube 76 and press fit into the first faucet tube 76 at a first end 116 of the flow coupler 114. The outer diameter of the flow coupler 114 at the first end 116 is slightly greater than the inner diameter of the first faucet tube 76 to allow the flow coupler 114 to have an interference fit with the first faucet tube 76. The flow coupler 114 may be fixed relative to the first faucet tube 76 in a variety of alternative ways. For example, the flow coupler 114 and the first faucet tube 76 may be integrally formed or machined from a single tube. Alternatively, the first end 116 of the flow coupler 114 may be configured to receive the first faucet tube 76 (i.e., the inner diameter of the first end 116 may be greater than the outer diameter of the first faucet tube 76).

The flow coupler 114 includes a pair of annular ribs 118 for restraining an o-ring 120 for sealing between the flow coupler 114 and a sleeve 122 (described below). The flow coupler 114 further includes a recess 128 for engaging a fastener 130, a snap ring in the example embodiment, that axially links the sleeve 122 to the flow coupler 114, effectively removably and pivotally linking the first faucet tube 76 to the second faucet tube 84. Various other fasteners 130 may be used, for example, the flow coupler 114 may be threaded to engage a castle nut, or a hole may be formed in the flow coupler 114 into which a cotter pin is secured. The flow coupler 114 is preferably made of metal, but may be made of plastic, composites, and the like, depending upon the application requirements.

A disk-shaped first wear washer 132 is sized to engage the flow coupler 114, the first faucet tube 76, and a first end 134 of the sleeve 122. As shown clearly in FIG. 4, the first wear washer 132 has a thicker inner portion 136 bearing against the flow coupler 114 and sleeve 122. A lip 138 of the first wear washer 132 is sandwiched between the first faucet tube 76 and the first end 134 of the sleeve 122. The first wear washer 132 aids the relative pivotal movement between the flow coupler 114 fixed relative to the first faucet tube 76 and the sleeve 122 that rotates in conjunction with the second faucet tube 84.

Next, the sleeve 122 is slid onto the flow coupler 114 until the first end 134 bears against the first wear washer 132. The sleeve 122 has a stepped profile with a smaller diameter second end 140. The sleeve 122 includes a reveal portion 142 adjacent the first end 134, a threaded portion 144 adjacent the second end 140, and an annular recess 146 for restraining an o-ring 148 disposed between the reveal portion 142 and the threaded portion 144. The threaded portion 144 is configured to link to the second faucet tube 84. In the example embodiment, the linking is achieved through mating internal threads formed in the second faucet tube 84. Alternatively, for example, a spring loaded ball may protrude into a matching pocket or opening formed in the second faucet tube 84, or a snap-fit configuration may be used to link the second faucet tube 84 and the sleeve 122. Again, the sleeve 122 is preferably made of metal, but may be constructed from plastics, composites, and the like. It is of note that various other linkage configurations are available and within the scope of the present invention.

Prior to linking the second faucet tube 84 to the sleeve 122, a second wear washer 150, having a similar geometry as the first wear washer 132, is slid over the flow coupler 114 and beyond the recess 128 formed near the second end 126 of the flow coupler 114. As a result, the snap ring fastener 130 effectively axially restrains the sleeve 122 (and mating second faucet tube 84) to the flow coupler 114 (and mating first faucet tube 76), yet allows the sleeve 122 and second faucet tube 84 to pivot freely. At the same time, fluid is allowed to flow from the flow passage 86 of the first faucet tube 76, through the flow passageway 124 defined by the flow coupler 114, and into the flow passage 86 defined by the second faucet tube 84. As a result, the first and second faucet tubes 76, 84 are in fluid communication with the outlet 14. Both the first wear washer 132 and the second wear washer 150 are preferably made of plastic, but may be made from silicone and the like, depending on the particular loads imparted in each application.

Assembly and disassembly of the swivel joint 80 is facilitated by the reveal portion 142 of the sleeve 122. Preferably, the reveal portion 142 includes a pair of offset flat sides 152 that can be engaged by a tool (e.g., an adjustable wrench). By holding the sleeve 122 stationary, one can unthread the second faucet tube 84 from the swivel joint 80, gaining access to the remaining components of the swivel joint 80. Additionally, the swivel joint 80 may be configured to provide a uniform diameter at the joint, giving a sleek joint appearance with minimal intrusion into the flow passageways of the swivel joint 80.

Figure 5:
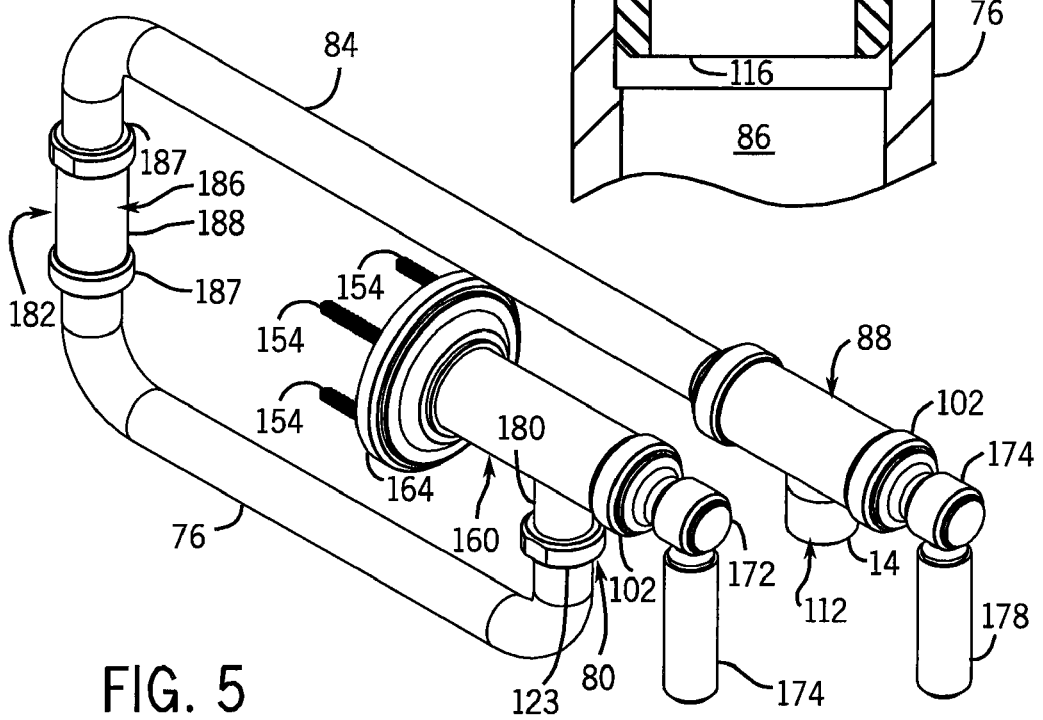
FIG. 5 is a perspective view of an alternative example embodiment of the invention in connection with a wall mounted pot filler faucet.
Figure 6:
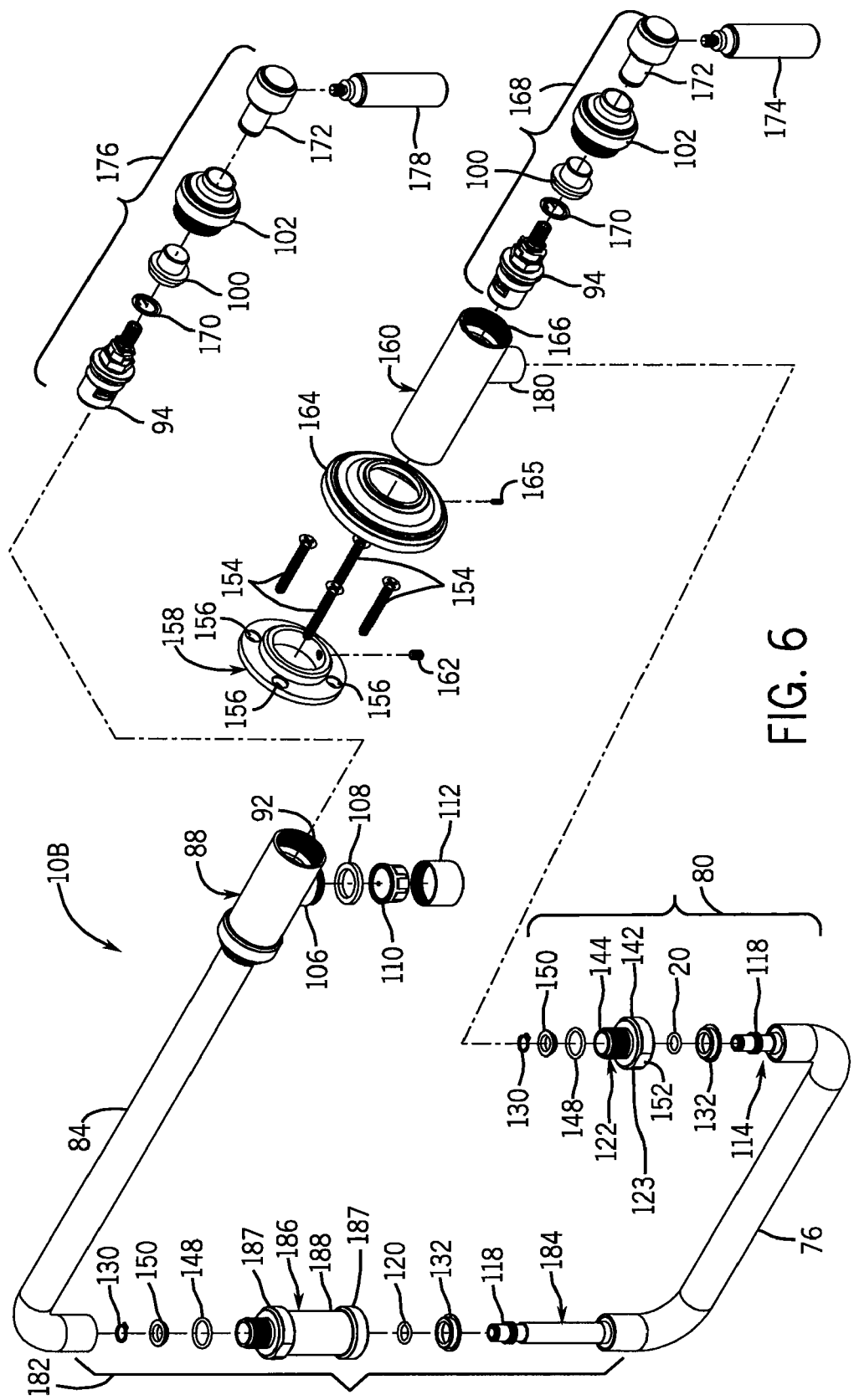
FIG. 6 is an exploded view of the faucet of FIG. 5.

An alternative example embodiment is shown in FIGS. 5 and 6, wherein a wall mount pot filler faucet 10B incorporates the invention. Similar elements have been given identical reference numerals throughout. The wall mount pot filler faucet 10B is secured to a wall (not shown) by a series of screws 154 that extend through matching holes 156 formed in a support flange 158. A valve body 160 is restrained in the support flange 158 by a setscrew 162 and coupled to a supply line (not shown). A decorative wall flange 164 is also slid over the valve body 160 and support flange 158 (secured by a setscrew 165) to provide a finished appearance.

The valve body 160 includes a threaded axial bore 166 receiving the components of a wall mount base valve assembly 168. Specifically, a valve cartridge 94 is threaded into the bore 166 and includes a retaining ring 170, handle support 100, bonnet 102, and a handle stem 172 with a base handle 174 threaded into a bore normal to the handle stem 172 axis. The handle stem 172 and handle support are coupled to the intermediate bonnet 102 by the retaining ring 170. The bonnet 102 is then threaded into the bore 166 securing the wall mount base valve assembly 168. A wall mount outlet valve assembly 176 is identical to the wall mount base valve assembly 168, but for the handle is referred to as the outlet handle 178.

An exit tube 180 protrudes form the valve body 160 of the wall mount base valve assembly 168 and leads to a swivel joint 80, identical to the swivel joint 80 discussed with reference to the first example embodiment above, but for the first faucet tube 76 is the exit tube 180 of the valve body 160 and the sleeve 122 includes a decorative flange 123. Continuing along the flow path, an alternative swivel joint 182 is incorporated.

The alternative swivel joint 182 has several main differences from the previous swivel joint 80. First, an elongated flow coupler 184 protrudes from the first faucet tube 76. Second, an elongated sleeve 186 has the effect of increasing the reveal portion 188 for stylistic purposes and includes decorative flanges 187. The balance of the alternative swivel joint 182 is identical to the previous swivel joint 80. The alternative example is included to provide a sense of the minor alterations to the invention that are within the scope of the present invention as called for in the claims.

It should be appreciated that merely example embodiments of the invention have been described above. However, many modifications and variations to the example embodiments will be apparent to those skilled in the art, which will be within the spirit and scope of the invention. Therefore, the invention should not be limited to the described embodiments. To ascertain the full scope of the invention, the following claims should be referenced.

What is claimed is:

1. A faucet having a swivel joint, comprising:
   a pair of faucet tubes defining flow passages;
   a flow coupler having a flow passageway in communication with the flow passages and extending between ends associated with the faucet tubes;
   a sleeve linked to one of the faucet tubes and linked to the flow coupler by a fastener so as to removably and pivotally link the faucet tubes; and
   a wear washer disposed between the flow coupler, the sleeve, and one of the faucet tubes to facilitate pivotal movement of the faucet tubes.

2. The faucet of claim 1, further comprising a second wear washer disposed between the flow coupler and the sleeve to facilitate pivotal movement of the first and second faucet tubes.

3. The faucet of claim 1, wherein the flow coupler includes a pair of annular ribs for restraining an o-ring sealing between the flow coupler and the sleeve.

4. The faucet of claim 1, wherein the sleeve includes an annular recess for restraining an o-ring sealing between the sleeve and the second tube.

5. A faucet having a swivel joint for adjusting the position of an outlet thereof, comprising:
   first and second faucet tubes defining flow passages in fluid communication with the outlet;
   a flow coupler having a flow passageway extending from a first end fixed relative to the first faucet tube to a second end so as to communicate with the flow passages of the first and second faucet tubes;
   a sleeve removably linked to the second faucet tube;
   a fastener linking the sleeve to the flow coupler so as to removably and pivotally link the first and second faucet tubes together; and
   a wear washer disposed between the first faucet tube, the flow coupler, and the sleeve to facilitate pivotal movement of the first and second faucet tubes.

6. The faucet having a swivel joint of claim 5, wherein the flow coupler is press fit into the first faucet tube.

7. The faucet having a swivel joint of claim 5, wherein the flow coupler is concentrically disposed in the first and second faucet tubes.

8. The faucet having a swivel joint of claim 5, wherein an outer diameter of the flow coupler is less than an inner diameter of the first faucet tube.

9. The faucet having a swivel joint of claim 5, wherein an outer diameter of the flow coupler is less than an inner diameter of the second faucet tube.

10. The faucet having a swivel joint of claim 5, wherein the sleeve and the second faucet tube include mating threads for removably linking the sleeve and the second faucet tube.

11. The faucet having a swivel joint of claim 5, wherein the fastener includes a snap ring and wherein the flow coupler includes a recess near the second end for engaging the snap ring.

12. The faucet having a swivel joint of claim 5, wherein the flow coupler includes a pair of annular ribs for restraining an o-ring sealing between the flow coupler and the sleeve.

13. The faucet having a swivel joint of claim 5, wherein the sleeve includes an annular recess for restraining an o-ring sealing between the sleeve and the second tube.

14. The faucet having a swivel joint of claim 5, further comprising a second wear washer disposed between the flow coupler and the sleeve to facilitate pivotal movement of the first and second faucet tubes.

15. The faucet having a swivel joint of claim 5, wherein the sleeve includes a threaded portion and a reveal portion.

16. The faucet having a swivel joint of claim 15, wherein the reveal portion is greater than the threaded portion.

17. The faucet having a swivel joint of claim 15, wherein the sleeve is a stepped cylindrical tube having a first end larger than a second end.

\* \* \* \* \*